United States Patent [19]

Kanaka et al.

[11] Patent Number: 5,183,878
[45] Date of Patent: Feb. 2, 1993

[54] EASILY PROCESSABLE, WHOLLY AROMATIC POLYESTER

[75] Inventors: Keiichi Kanaka; Noriyuki Hayashi; Toshihiro Kobashi; Yukihiko Kageyama; Kenji Hijikata, all of Shizuoka, Japan

[73] Assignee: Polyplastics Co., Ltd., Osaka, Japan

[21] Appl. No.: 763,238

[22] Filed: Sep. 20, 1991

[30] Foreign Application Priority Data

Sep. 20, 1990 [JP] Japan .................................. 2-251335

[51] Int. Cl.$^5$ ...................... C08G 63/00; C08G 63/18; C08G 63/02
[52] U.S. Cl. .................................. 528/193; 528/190; 528/194; 528/219; 528/271; 528/272
[58] Field of Search ............... 528/193, 190, 194, 271, 528/272, 219

[56] References Cited

U.S. PATENT DOCUMENTS

| | | | |
|---|---|---|---|
| 4,067,852 | 1/1978 | Calundann | 528/190 |
| 4,083,829 | 4/1978 | Calundann et al. | 528/176 |
| 4,118,372 | 10/1978 | Schaefgen | 528/190 |
| 4,130,545 | 12/1978 | Calundann | 524/604 |
| 4,181,792 | 1/1980 | Jackson, Jr. et al. | 528/190 |
| 4,219,461 | 8/1980 | Calundann | 528/173 |
| 4,256,624 | 3/1981 | Calundann | 524/599 |
| 4,318,841 | 3/1982 | East et al. | 524/605 |
| 4,337,191 | 6/1982 | Favstritsky | 524/599 |
| 4,375,530 | 3/1983 | Hay et al. | 524/605 |
| 4,431,770 | 2/1984 | East et al. | 524/599 |
| 4,473,682 | 9/1984 | Calundann et al. | 524/605 |
| 4,684,712 | 8/1987 | Ueno et al | 528/190 |
| 4,746,694 | 5/1988 | Charbonneau et al. | 524/602 |
| 4,983,713 | 1/1991 | Hayashi et al. | 528/190 |
| 5,015,722 | 5/1991 | Charbonneau et al. | 528/190 |

FOREIGN PATENT DOCUMENTS 0356226 2/1990 European Pat. Off. .

*Primary Examiner*—John Kight, III
*Assistant Examiner*—T. Mosley
*Attorney, Agent, or Firm*—Burns, Doane, Swecker & Mathis

[57] ABSTRACT

An improved easily processable wholly aromatic polyester exhibiting melt anisotropy and excellent thermal stability is provided which consists essentially of the structural units (i) to (iii) wherein:

(i) is $-\overset{O}{\overset{\|}{C}}-Ar_1-\overset{O}{\overset{\|}{C}}-$, (ii) is $-\overset{O}{\overset{\|}{C}}-Ar_2-\overset{O}{\overset{\|}{C}}-$, and (iii) is $-O-Ar_3-O-$, and wherein $Ar_1$ is 1,4-phenylene, $Ar_2$ is 2,6-naphthalene and 2,7-naphthalene, and $Ar_3$ is 1,4-phenylene and/or 4,4'-biphenylene.

11 Claims, No Drawings

EASILY PROCESSABLE, WHOLLY AROMATIC POLYESTER

This invention relates to an easily processable, wholly aromatic polyester.

BACKGROUND OF THE INVENTION

Various wholly aromatic polyesters have thus far been introduced because of their outstanding heat resistance and economical material supply. Especially a combination of terephthalic acid with hydroquinone is predominant over other combinations in that it achieves greater economy in attaining high heat resistance. On the other hand, the polyester of the particular combination has not been endowed with easy processability. To this end the polyester requires the addition of a third component of a special structural unit which helps secure a temperature sufficient for easy processing, otherwise it is impossible to achieve an adequate temperature for processing. Incorporation of a hydroxybenzoic acid residue, for example, is of no practical significance since it raises the processing temperature for the polyester to a range above 400° C.

SUMMARY OF THE INVENTION

In view of the above, the present inventors have made an intensive search for a polymer which is easy to process and economically advantageous. This effort has now resulted in the present invention.

The invention concerns as easily processable wholly aromatic polyester consisting essentially of structural units represented by the formulas (i) to (iii) where:

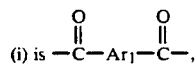

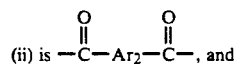, and (iii) is —O—Ar$_3$—O—, wherein Ar$_1$ is 1,4-phenylene; Ar$_2$ is selected from the group consisting of 2,6-naphthalene, 2,7-naphthalene, and mixtures of these; and Ar$_3$ is selected from the group consisting of 1,4-phenylene, 4,4'-biphenylene, and mixtures of these.

The structural unit of Ar$_2$ consisting of naphthalenes accounts preferably for 10 to 90%, still preferably for 20 to 80%, of the total carboxylic acid units. An amount far outside this range will not impart easy processability to the polyester.

The 2,6-naphthalene unit desirably accounts for 10 to 90% of the total naphthalene units. A more desirable range is 20 to 80%. A value far outside this range again will not impart easy processability.

Ar$_3$ is selected from 1,4-phenylene and/or 4,4'-biphenylene. The selection depends on the desired physical properties of the polymer for the intended purpose. In a preferred embodiment Ar$_3$ is 1-4 phenylene.

A structural unit represented by the general formula (iv) where:

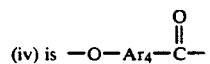

in which Ar$_4$ is selected from the group consisting of phenylene, 2,6-naphthalene, and mixtures of these, optionally may be added in an amount not exceeding 15% of the total structural units.

Besides the major structural units described above, various other structural units may be added as desired, although the unit or units thus added must account for at most 10% of the total amount of the structural units. Those extra structural units include non-para-substituted aromatic structural units that do not show linearity, branched component structural units, ionic group-containing structural units, monofunctional structural units as molecular weight modifiers, and chain extenders to be subsequently incorporated. In order to embody those structural units, various compounds ordinarily capable of forming esters are used. The compounds represented by the formula (i) are, for example, the terephthalic acid diesters, such as the dimethyl, diethyl, dibutyl and diphenyl diesters, and halides, such as the dichloride of terephthalic acid.

The compounds in which the ester residue shown in the formula (ii) is present include diesters of acids, such as dimethyl, diethyl, dibutyl, and diphenyl esters of 2,6-naphthalene- and 2,7-naphthalenedicarboxylic acids, and halides, such as the dichlorides, of the naphthalenedicarboxylic acids.

Among the compounds in which the ester residue shown in the formula (iii) is present are hydroquinone, 4,4'-dihydroxybiphenyl, and their diacetates, dipropionates, and dibenzoates.

The compounds in which the ester residue shown in the formula (iv) is present are p-hydroxybenzoic acid, 2-hydroxy-6-naphthoic acid, and their methyl, ethyl, propyl, butyl, phenyl, and other esters, their halides such as acid chlorides, and acid esters such as those of acetic, propionic, and benzoic acids.

The structural units that can be added, when desired, to the afore-described major structural units are as follows.

Examples of the ester-forming compounds are, the non-para-substituted aromatic compounds that do not show linearity, isophthalic acid and its derivatives capable of forming an ester, i.e., dimethyl, diethyl, dibutyl, diphenyl, and other esters of isophthalic acid, halides such as acid chlorides, and m-hydroxybenzoic acid and its derivatives capable of forming esters, i.e., esters of acetic, propionic, and benzoic acids, esters of methanol, ethanol, propanol, butanol, phenol, etc., and halogen compounds such as acid chlorides. Resorcinol, bisphenols having flexible bonds in the compounds, such as 4,4'-dihydroxydiphenylpropane, 4,4'-dihydroxydiphenyl sulfone, 4,4'-dihydroxydiphenyl ketone, 4,4'-dihydroxydiphenyl ether, and 4,4'-dihydroxydiphenyl-p-bispropylidenephenylene, and derivatives thereof, i.e., acid diesters of acetic, propionic, benzoic, and other acids, may be used as well.

Branched components can be used insofar as they have moldability as substantially linear polymers. The structural units are polyfunctional ester-forming compounds, i.e., polyfunctional carboxylic acids, such as trimesic, trimellitic, and promellitic acids, and their derivatives, such as methyl, ethyl, butyl, phenyl, and other polyfunctional esters, acid chlorides and other polyfunctional halides, and partial or total acid anhydrides. Polyfunctional hydroxy compounds and their derivatives also come within this category.

Typical of ionic group-containing compounds is the sodium salt of dimethyl sulfoisophthalate. The use of a molecular weight modifier or a blocker at the end of a molecular chain is a technique well known to those skilled in the art. The compounds which serve to achieve this end are typified by monofunctional epoxy compounds, isocyanate compounds, and ester-forming compounds. Phenyl glicydyl ether and acetoxy-p-phenylphenol are typical examples.

Chain extenders that can be added subsequently are, for example, diphenyl carbonate, diphenyl terephthalate, bisoxazoline, bisepoxide, diisocyanate, and carbodiimide.

From these compounds the polymer of the invention is prepared using the direct polymerization or transesterification technique. The compounds capable of forming esters may be used as they are in the polymerization. Alternatively, they may be converted from the precursors into ester-forming derivatives in the prepolymerization stage in the same reactor or prior to addition to the reactor.

While the polymerization may be effected in any manner known in the art, solution, melt, or slurry polymerization or the like is usually used.

Various catalysts may be employed for the polymerization. Typical of them are dialkyltin oxides, diaryltin oxides, titanium dioxide, alkoxy-titanium silicates, titanium alcoholates, alkali and alkaline earth metal salts of carboxylic acids, and Lewis acids such as $BF_3$.

The amount of the catalyst to be used is usually about 0.001 to about 1% by weight, preferably about 0.01 to about 0.2% by weight, on the basis of the total monomer weight.

The polymer prepared by the above-described polymerization procedure may further be subjected to solid phase polymerization, which involves heating under reduced pressure or in an inert gas, for increasing the molecular weight.

The wholly aromatic polyester prepared by the polymerization has good processability. For the purposes of the invention the term "good processability" in principle means a processing temperature desirably not exceeding 370° C. The fluidity in a molten state, i.e., the melt viscosity, under a shear stress of $10^2$ $sec^{-1}$ should have a region not beyond $1 \times 10^6$ poises in the temperature range from the softening point to 370° C. A preferred viscosity region is up to $1 \times 10^5$ poises. A temperature above 370° C. is not commensurate with the object of the present invention, because it necessitates special molding equipment in place of an ordinary unit which can no longer handle the polyester with ease. Moreover, a higher molding temperature has a greater deteriorating effect upon the resin itself, which is out of accord with the aim of producing desirably shaped articles.

The polyester of the invention may contain various inorganic and organic fillers in fibrous, granular, particulate, flaky, or platy form, depending on the intended use.

Examples of the fibrous fillers are inorganic fibrous substances such as the fibers of glass, asbestos, silica, silica-alumina, alumina, zirconia, boron nitride, silicon nitride, boron, and potassium titanate; and also metallic fibrous substances such as the fibers of stainless steel, aluminum, titanium, copper, and brass. The most typical fibrous filler is glass fiber. High-melting organic fibrous substances of polyamides, fluroresins, polyester resins, acrylic resins, etc., may be used as well.

The granular or particulate fillers include carbon black, graphite, silica, quartz powder, glass beads, milled glass fiber, glass balloons, glass powder, and silicates such as calcium silicate, aluminum silicate, kaolin, talc, clay, diatom earth and wollastonite; iron oxide, titanium oxide, zinc oxide, antimony trioxide, alumina, and other metal oxides; carbonates of metals, such as calcium carbonate and magnesium carbonate; sulfates of metals, such as calcium sulfate and barium sulfate; and also ferrites, silicon carbide, silicon nitride, boron nitride, and various metal powders.

The flaky or platy fillers include mica, glass flakes, and various metal foils.

Among exemplary organic fillers are aromatic polyester fibers, liquid crystal polymer fibers, aromatic polyamide and polyimide fibers, and other heat-resistant, high-strength synthetic fibers.

These organic and inorganic fillers can be used singly or in a combination of two or more. A combination of a fibrous filler with a granular or flaky filler is particularly desirable because it combines mechanical strength, dimensional accuracy, electrical properties, etc. The amount of the inorganic filler or fillers is not more than 95% by weight, preferably 1 to 80% by weight, on the basis of the total amount of the composition.

In using such a filler or fillers, it is desirable, where necessary, to use also a binder or surface treatment.

The polyester according to the invention may further contain as an auxiliary component another thermoplastic resin provided it is not detrimental to the realization of the object of the invention.

Examples of the thermoplastic resins useful for this purpose are polyolefins such as polyethylene and polypropylene; aromatic polyesters composed of a diol and an aromatic dicarboxylic acid, such as polyethylene terephthalate or polybutylene terephthalate, or oxycarboxylic acid; and polyacetals (homo- or copolymers), polystyrenes, polyvinyl chlorides, polyamides, polycarbonate, ABS, polyphenylene oxides, polyphenylene sulfides, and fluororesins. These thermoplastic resins may be used also as a mixture of two or more.

In the practice of the invention various additives may be used in the manner well to those skilled in the art. Examples are antistatic agents, antioxidants, ultraviolet absorbers, and dyes.

Advantages of the Invention

The wholly aromatic polyester obtained in accordance with the invention has such excellent heat resistance and good processability that they can be effectively molded into fibers, films, sheets, and other products as injection molded or extruded articles.

These molded articles are advantageously used in connectors, printed circuit boards, surface mounted components, and other applications in the electronics field where heat resistance is a prerequisite.

EXAMPLES

The present invention will now be described in more detail in connection with the following Examples which are not intended to be limiting.

EXAMPLE 1

A reactor equipped with an agitator, nitrogen supply line, and distilling tube was charged, as shown in Table 1, with 15 mol % of terephthalic acid, 15 mol % of 2,6-naphthalenedicarboxylic acid, 20 mol % of 2,7-naphthalenedicarboxylic acid, 50 mol % of 1,4-diacetoxyhydroquinone, and 0.05% by weight of potassium acetate on the basis of the total amount of the feed.

The mixture was heated in a stream of nitrogen to 260° C. over one hour. While acetic aicd was distilled out of the reactor, the feed was heated at 260° to 300° C. for two hours and at 300° to 350° C. for another two-hour period, and acetic acid was distilled away under reduced pressure (2 mmHg). The reaction mixture was then cooled down to room temperature by the introduction of nitrogen.

The polymer thus obtained was light yellow brown. Its melting point as measured with a differential thermal analyzer manufactured by MAC Science Co., Ltd was 335° C. The temperature at which this polymer attained a viscosity of $10^5$ poises under a shear stress of $10^{-2}$ sec$^{-1}$ was 350° C. as measured with a Capirograph manufactured by Toyo Seiki Seisaku-Sho.

Tensile test pieces were made from this polymer and tested at 350° C. using a "Minishot Model 2" tester manufactured by Yokohama Chemix Co., Ltd. The tensile strength was 920 kg/cm², tensile modulus 39000 kg/cm², and the elongation was 11%.

EXAMPLES 2 TO 8

Generally following the procedure of Example 1, the mixtures of the formulations listed in Table 1 were separately polymerized. In Examples 2 and 3, the final polymerization temperature was changed to 365° C.

The resultant polymers were tested in the same way. The test pieces were prepared at the temperatures where a viscosity of $10^5$ poises was reached. The results are given in Table 1.

Comparative Example 1

The mixture shown in Table 1 was polymerized generally in the same manner as that of Example 1. It was heated at 260° to 300° C. for two hours and further at 300° to 360° C. for two hours. Acetic acid was distilled out in a vacuum and a decomposition gas developed. The product was in the form of dark brownish lumps not having a melting point below 400° C. The product was incapable of further evaluation.

EXAMPLE 9

The polymer obtained in Example 1 was mixed with 30% by weight of glass fiber and extruded while employing an extruder manufactured by Haaka Mess Technik GmbH, U,Co. Tensile test pieces were made and tested in the same manner. The results are given in Table I.

TABLE 1

| | Monomer composition (mol %) | | | | | | Tm (°C.) | Temp. at which melt viscosity of $10^5$ poises was reached (°C.) | Tensile strength (kg/cm²) | Tensile modulus (kg/cm²) | Elong. (%) | Remarks |
|---|---|---|---|---|---|---|---|---|---|---|---|---|
| | (i) | (ii) | | (iii) | | (iv) | | | | | | |
| | TPA | 26NDA | 27NDA | HQ | BP | | | | | | | |
| Ex. 1 | 15 | 15 | 20 | 50 | — | — | 335 | 350 | 920 | 39000 | 11 | |
| 2 | 15 | 20 | 15 | 50 | — | — | 350 | 365 | 930 | 40000 | 9 | |
| 3 | 20 | 10 | 20 | 50 | — | — | 350 | 364 | 910 | 38000 | 11 | |
| 4 | 10 | 20 | 20 | 50 | — | — | 340 | 355 | 890 | 37000 | 13 | |
| 5 | 15 | 15 | 20 | — | 50 | — | 320 | 330 | 950 | 41000 | 12 | |
| 6 | 15 | 15 | 20 | 40 | 10 | — | 330 | 343 | 930 | 39000 | 11 | |
| 7 | 13.5 | 13.5 | 18 | 45 | — | HBA 10 | 330 | 338 | 970 | 42000 | 9 | |
| 8 | 13.5 | 13.5 | 18 | 45 | — | HBA 8 HNA 2 | 320 | 327 | 970 | 41000 | 9 | |
| Comp. Ex. 1 | 20 | 28 | 2 | 50 | — | — | >400 | | | | | too high melting point to be molded |
| Ex. 9 | Polymer of Example 1 mixed with 30 wt % of glass fiber | | | | | | — | — | 1710 | 100000 | 3 | |

TPA = terephthalic acid
26DNA = 2,6-naphthalenedicarboxylic acid
27NDA = 2,7-naphthalenedicarboxylic acid
HQ = 1,4-diacetoxyhydroquinone
BP = 4,4'-diacetoxybiphenyl
HBA = p-acetoxybenzoic acid
HNA = 2-acetoxy-6-naphthoic acid Although the invention has been described with preferred embodiments it is to be understood that variations and modifications may be employed without departing from the concept of the invention as defined in the following claims.

We claim:

1. An easily processable wholly aromatic polyester consisting essentially of structural units represented by the formulas (i) to (iii) where:

(i) is 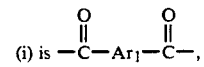, (ii) is 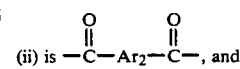, and (iii) is 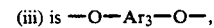, and wherein Ar$_1$ is 1,4-phenylene; Ar$_2$ is a mixture of 2,6-naphthalene and 2,7-naphthalene wherein 2,6-naphthalene is present in a concentration of 10 to 90 mole percent based upon the total concentration of 2,6-naphthalene and 2,7-naphthalene; and Ar$_3$ is selected from the group consisting of 1,4-phenylene, 4,4'-biphenylene, and mixtures of these; and unit (ii) constitutes 10 to 90 mole percent of the units derived from a dicarboxylic acid present in said polyester.

2. A polyester of claim 1 which further comprises a structural unit represented by the formula (iv) where:

(iv) is 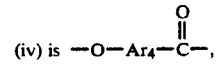, and wherein Ar$_4$ is selected from the group consisting of 1,4-phenylene, 2,6-naphthalene, and mixtures of these, and is present in an amount not to exceed 15 mole percent of the total structural units present in said polyester.

3. A polyester of claim 1 wherein unit (ii) constitutes 20 to 80 mole percent of the total units derived from a dicarboxylic acid present in said polyester and the quantity of 2,6-naphthalene units in relation to the total amount of $Ar_2$ present in unit (ii) is 20 to 80 mole percent.

4. A polyester of claim 1 wherein $Ar_3$ of unit (iii) is 1,4-phenylene.

5. A polyester of claim 1 wherein $Ar_3$ of unit (iii) is 4,4′biphenylene.

6. A polyester of claim 1 which is capable of undergoing melt processing at a temperature of 370° C. or below.

7. A polyester of claim 1 which has incorporated therein a filler in an amount of not more than 95 percent by weight based upon the total weight of the composition.

8. A polyester of claim 1 which has incorporated therein a filler in an amount of 1 to 80 percent by weight based upon the total weight of the composition.

9. A polyester of claim 7 wherein the filler is glass fiber.

10. A polyester of claim 8 wherein the filler is glass fiber.

11. A polyester of claim 1 which has incorporated therein glass fiber in an amount of 30 percent by weight based upon the total weight of the composition.

* * * * *